United States Patent [19]

Katou et al.

[11] Patent Number: 5,206,771
[45] Date of Patent: Apr. 27, 1993

[54] TAPE DRIVE MECHANISM

[75] Inventors: Daiichirou Katou; Tamotsu Mitsuyasu; Kazuo Abe; Takuji Sekiguchi; Hitoshi Yanagisawa, all of Tokyo; Tsuneharu Hashizume, Shimosuwa; Toshihiko Okina, Komagane; Mitsutaka Miyashita; Masaki Gotoh, both of Shimosuwa, all of Japan

[73] Assignee: Kabushiki Kaisha Sankyo Seiki Seisakusho, Japan

[21] Appl. No.: 571,641

[22] PCT Filed: Mar. 3, 1989

[86] PCT No.: PCT/JP89/00234

§ 371 Date: Aug. 30, 1990

§ 102(e) Date: Aug. 30, 1990

[87] PCT Pub. No.: WO89/08309

PCT Pub. Date: Sep. 8, 1989

[30] Foreign Application Priority Data

Mar. 4, 1988 [JP] Japan .................. 63-49825
Apr. 21, 1988 [JP] Japan .................. 63-99154
Jun. 15, 1988 [JP] Japan .................. 63-147558

[51] Int. Cl.⁵ .......................................... G11B 15/60
[52] U.S. Cl. ................................ 360/71; 242/57.1; 226/15
[58] Field of Search .............. 360/69, 71, 75, 72.1, 360/77.12, 78.02, 96.3, 130.2-130.23, 90, 93; 242/57.1, 57; 226/3, 15-23

[56] References Cited

U.S. PATENT DOCUMENTS 4,363,042 12/1982 Kimura et al. .................. 360/71
4,485,982 12/1984 St. John et al. .................. 242/57.1

FOREIGN PATENT DOCUMENTS 52-51913  4/1977  Japan .
52-70813  6/1977  Japan .
55-66443  5/1980  Japan .
55-132522 10/1980 Japan .
58-196653 11/1983 Japan .
61-132544  8/1986  Japan .
62-29618   2/1987  Japan .
62-205560  9/1987  Japan .
62-279546 12/1987 Japan .................. 360/71

Primary Examiner—Jerry Smith
Assistant Examiner—Steven R. Garland
Attorney, Agent, or Firm—Welsh & Katz, Ltd.

[57] ABSTRACT

A tape drive mechanism for a video tape recorder and an audio tape recorder. The tape drive mechanism automatically corrects the position of tape in the width-wise direction thereof without mechanically restricting the edge of tape. Sensors (8) and (8) on a tape path detect a dislocation of the tape (7) from a reference running position that may develop in the width-wise direction of the tape (7), a tape guide post (1) for attracting the tape (7) is moved in the width-wise direction of the tape, or inclination of a tape guide post (41) is changed to move the tape (7) in such width-wise direction by means of actuators (2), (42) and (62) that give corresponding displacement based on the values detected by the sensors (8) and (8), or the reel plate (57) is moved in the direction of width of tape to move the tape (7) together with the reel (24). The tape (7) having a small thickness is prevented against vertical movement on the tape path and is permitted to run stably without damaging the edges of the tape.

5 Claims, 7 Drawing Sheets

TAPE DRIVE MECHANISM

TECHNICAL FIELD

The present invention relates to a tape drive mechanism, and, more particularly, to a tape drive mechanism for a magnetic recording/reproducing apparatus such as a video tape recorder and an audio tape recorder which drive a magnetic tape to record or reproduce data.

BACKGROUND ART

Video tape recorders or audio recorders perform a tape drive operation by means of a tape drive mechanisms provided therein, but are basically prone to such trouble that, if the tape, while being driven by that drive mechanism, is dislocated in its width-wise direction, the track of the tape results in deviation, making thus inactive the recording/reproducing functions of those recorders. To avoid the trouble, the arrangement of hitherto, conventional tape drive mechanism has been such that the tape guide posts, which allows sliding of a tape upon each of their surfaces, are equipped with a flange in order for the upper end of the tape or the lower end of the same to come in contact with the flange, or in the mechanism of the type having a rotary drum, a lead is formed on the outer surface of the drum, whereby the tape is mechanically limited its running in the width-wise direction and thus the running position of the tape is adjustingly retained within a given normal point. Further, in the past, no particular tape drive mechanism has been proposed, which has a function for positively eliminating a non-nearly or non-uniformly wound state of the tape around a tape reel. This poor tape winding has been forcibly caused into a normal winding state by the use of the flange of tape guide post or lead on the rotary drum.

However, such prior-art arrangement is based on the forcible way to cause the edges of tape (both side edges of tape as viewed width-wise) to coincide with the flanges of the tape guide post or the lead of the rotary drum, so as to mechanically restrict the running path of the tape within the width-wide direction. Consequently, if the tape is badly non-nearly wound upon a cassette reel, if the tape guide post is not disposed exactly in a perpendicular relation with the tape, or if the tape is run out of a normal path excessively in its width-wise direction due to an excessive large tension exerted on the tape, then the tape being run is at its edges subject to a non-rectilinear friction from the foregoing tape guide post flanges or lead of rotary drum, and the tape per se is not run along stably, which creates a jitters, and may give a damage to the tape in a worst case. Those unfavorable aspects will be more serious, if the tape is of a more thin thickness, and possibly the tape may be prevented from running in a worst situation. For the reasons, it has been difficult to reduce the thickness of the tape as well as to increase a memory capacity of the tape.

DISCLOSURE OF THE INVENTION

An object of the present invention is to provide a tape drive mechanism for causing a stable run of a tape having a reduced thickness, without damaging the edge of the tape. More particularly, an object of the present invention is to provide a tape drive mechanism capable of automatically correcting the position of a tape in the direction of the height of the tape, that is, in the direction of the width of the tape without performing a mechanical restriction of the tape edges. An object of the present invention is to realize a reliable stable run of a tape and to reduce the thickness of the tape for the purpose of enlarging the memory or store capacity of the tape and preventing generation of jitters.

In order to achieve the above-described object, a tape drive mechanism according to the present invention comprises: a guide post having no flange for restricting the tape in a width-wise direction thereof, the tape guide post having, formed on its surface which the tape is to contact, a suction hole communicated with a negative pressure source, so as to attract the tape thereto; a sensor for detecting a dislocation of the tape from a reference running position thereof in the width-wise direction; and an actuator for moving the tape guide post in the width-wise direction of the tape in response to a detection signal supplied by the sensor.

Accordingly, the tape is run on the tape guide post while at the same being attracted or drawn thereto. The sensor detects a deviation of the tape from the reference running position in its width-wise direction. Hence, the actuator is operated, responsive to a detection signal supplied from the sensor, so as to cause the tape guide post to move in the width-wise direction of the tape. Owing to the attraction of the tape onto the guide post, the tape is caused to move together with the movement of the guide post, by means of which, the position of the tape is corrected in its width-wise direction.

A tape drive mechanism according to the present invention comprises: a sensor for detecting the dislocation of the tape from a reference running position of the tape in its width-wise direction; a tape guide post having no flange for restricting the edges of the tape; and a bimorph piezoelectric device to which is fastened an end part of the tape guide post, the bimorph piezoelectric device holding the tape guide post at a predetermined position to thereby cause contact of the tape guide post with the tape in the width-wise direction of the same tape, wherein the piezoelectric device erects in a direction along such width-wise direction of the tape, and the tape guide post, which is disposed at the end part of the piezoelectric device, is positioned between the tape and piezoelectric device, whereby the warp or to reversely warp the piezoelectric device leads to inclining the guide post such as to cause displacement of the tape upon the post towards a predetermined position, thereby keeping the tape to run there.

Accordingly, if the sensor detects that the tape is dislocated in its width-wise direction, the bimorph piezoelectric device, in response to an output electric signal being supplied by that sensor, causes a change in the inclination of the tape guide post which guides the tape, with the result that the tape is displaced on the tape guide post in the width-wise direction and corrected its running position along a tape path in the same direction for return to the reference running position. Further, such mechanism for inclining the guide post may be simplified in structure by fastening it directly to the bimorph piezoelectric device, wherein the dimension of the mechanism is reduced in the width-wise direction of the tape. Still further, according thereto, the warping motion of the bimorph piezoelectric device is not imparted to the tape guide post in any amplified way, but a mechanical strain per se in that piezoelectric device is simply transformed into an inclination of the guide post, which improves the control operation.

Moreover, according to the present invention, the bimorph piezoelectric device supporting the tape guide post may be supported by another same device, whereby simultaneously with the inclination of the tape guide post for achieving a run of the tape at a given position, the tape guide post per se can be bodily moved in a direction perpendicular to a direction in which the tape is run. Thus, the tape guide post inclination central point, in relation to which the guide post is inclined, may be retained at a fixed location, so as to case the tape to run at a given running position.

Accordingly, the sensor, when detecting the widthwise dislocation of the tape, emits an output electric signal, and in response the signal, the actuator is operated to vary the inclination of the tape guide post, with the result that the tape, by the reason of it being applied a tension, may be moved upon the tape guide post in the width-wise direction of the tape, so as to correct the dislocation of the tape for its return to the reference running position.

A tape drive mechanism according to the present invention comprises: a sensor for detecting an amount of dislocation of the tape from a reference running position in a width-wise direction of the tape; and an actuator for moving either or both of a reel base and a winding reel base in the width-wise direction of the tape in accordance with the amount of tape dislocation supplied from the sensor.

Consequently, the sensor detects to what degree the tape is dislocated from the reference running position in its width-wise direction, when rewinding the tape or driving it for reproducing/recording purpose. The actuator disposed on the reel base is feedback-controlled responsive to such degree of tape dislocation, so as to return the tape to a normal height or the reference running position. Thus, even if non-uniform winding of the tape is generated due to the positional change in the direction of the width of the tape on the tape path, the tape can be rewound to the supply reel base with the change corrected. Furthermore, if there is non-uniform winding which could not be eliminated at the time of the running of the tape, it can be restored to the normal state.

Therefore, according to the present invention, the change of the position of a tape taken place due to the non-uniform winding of the reel, change in the rotation and change in the tape tension can be restricted. In particular, in a case where a thin type tape having poor rigidity is used, the restricting force acting between the lead of the rotational drum or the like and the tape edges can be reduced. As a result, the tape can be reliably and stably run on a predetermined tape path without the damage of the tape edges.

BRIEF DESCRIPTION OF DRAWINGS

FIGS. 1 to 5 illustrate an embodiment of a tape drive mechanism according to the present invention, wherein

FIGS. 6 to 10 illustrate another embodiment of the tape drive mechanism according to the present invention, wherein FIGS. 11 to 14 illustrate another embodiment of the tape drive mechanism according to the present invention, wherein

BEST MODE FOR CARRYING OUT THE INVENTION

The structure of the present invention will now be described with reference to an embodiment of the present invention.

Referring to FIGS. 1 to 5, an embodiment in which the present invention is applied to a tape guide post will be described. A tape drive mechanism according to this embodiment is so arranged that a tape is driven by an actuator which being attracted onto a tape guide post which is movable in the direction of the width of the tape and that a deviation of the tape from a reference running position, width-wise of the tape, will be detected by a sensor to cause a proper movement of the tape guide post through the actuator. The movement of the guide post, therefore, brings the deviated tape back to the reference running position.

Figure 1:
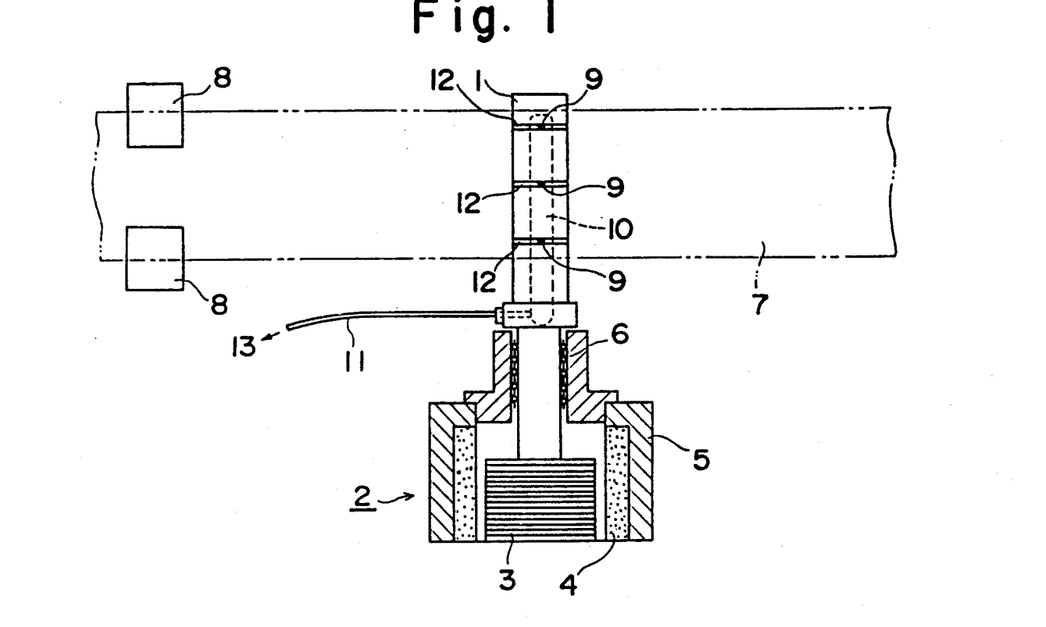
FIG. 1 is a partial cross-sectional front view which illustrates an example in which the present invention is applied to a tape guide post.

Reference is now made to the embodiment as in FIG. 1 wherein a voice coil motor is employed for an actuator 2 which is adapted to move a tape guide post 1 in the direction of the width of a tape 7. In this embodiment, a negative pressure is utilized as a means for attracting the tape 7 to the surface of the guide post 1. The tape guide post 1 is shaped in the form of a straight rod, having no restricting flange for restricting the tape 7 in the direction of the width of the tape 7. Such tape guide post 1 is, via a linear ball bearing 6, supported by a casing 5 secured to a base member of a video tape recorder or an audio tape recorder in such a manner that the tape guide post 1 is free to move in the direction of the width of the tape 7. A voice coil 3 is fastened to the lower portion of the tape guide post 1 and a magnet 4 is placed in the casing 5, circumscribing the voice coil, which constitutes thus a voice coil motor forming the actuator 2. A voice coil 3 is fastened to the lower portion of the tape guide post 1 and a magnet is placed in the casing 5, circumscribing the voice coil 3, which constitutes thus a voice coil motor forming the actuator 2. According to thus-formed voice coil motor, if the tape 7 is dislocated in its width-wise direction, the sensor 8 detects the degree of such tape dislocation and a control electric signal corresponding thereto is imparted to the voice coil 7, which then generates a magnetic flux, with the result that a repulsive or resilience force is generated between the flux and magnet 4 to cause the tape guide post 1 to move vertically or in the width-wise direction of the tape 7. The tape guide post 1 is adapted to guide the tape 7 being run, and has, formed at its outer surface, sucking holes 9 for drawing or attracting the tape 7 thereto. The sucking holes 9 are each communicated with a communication bore 10 formed in the tape guide post 1, the sucking holes 9 being further communicated to a negative pressure source 13 via a tube 1. When air is sucked through the sucking holes 9, a negative pressure is generated around the sucking holes 9, thereby drawing the tape 7 securely to the tape guide post 1. The post 1 has annular grooves 12 so formed that they respectively pass on the sucking holes 9 to thereby provide a proper distribution of the negative pressure regions. In the vicinity of the tape guide post 1, are disposed sensors for detecting the location of upper and lower ends of the tape 7, namely, optical sensors 8, 8, the sensors being positioned along the tape path. If the tape 7 has deviated from the reference running position in the direction of the width of the tape 7, the amount of such tape deviation is detected by the optical sensors 8, which in turn feeds it back to the voice coil 3, thereby causing movement of both tape guide post 1 and tape 7 drawn securely thereto towards a normal position. In this way, the width-wise deviation of the tape 7 are corrected to a normal running path without damaging the edges of the tape 7, making thus reliable the operation of the tape drive mechanisms or systems. It is noted that the optical sensors 8 may be arranged with respect to only one of the upper and lower edges of the tape for its location detecting purpose.

With the foregoing tape drive arrangement, the sliding correction of the tape 7 upon the tape guide post 1 requires a force for overcoming the tape drawing force of the negative pressure, but generally in most cases, such drawing force does not affect the operation, and is so week, in view of the fact that, the tape 7, during drive, normally assumes such a small tension of a few tens of grams in its longitudinal direction, and even so small is the friction between the tape 7 and guide post 1, that the tape 7 can be easily moved in a direction crossing vertically that of the tension and friction.

Figure 2:
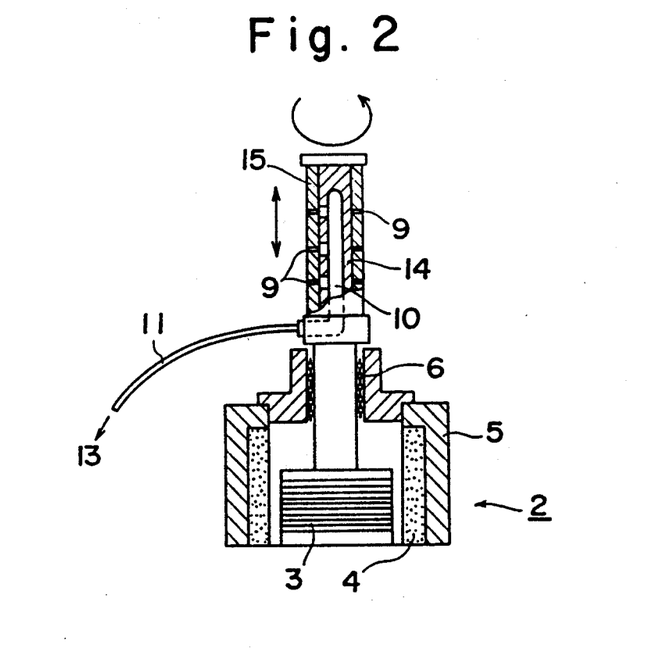
FIG. 2 is a partial cross-sectional front view which illustrates another embodiment of the tape guide post which can be applied to the present invention.

If a more stable tape drive system is desired, a structure as shown in FIG. 2 may be arranged, wherein the tape guide post 1 is constituted by a supporting shaft 14 and a roller 15 engaged rotatably thereto, such that the tape guide post 1 is brought to rolling contact with the tape 7. The roller 15 has a proper number of sucking holes 9 formed on the surface thereof. The sucking holes 9 are connected to a negative pressure source 13 via the communication bore 10 in the supporting shaft 14 and a tube 11. Such arrangement of the tape guide post 1 eliminates undesirable influences of the same upon the tape 7 being run thereon.

Figures 3, 4:
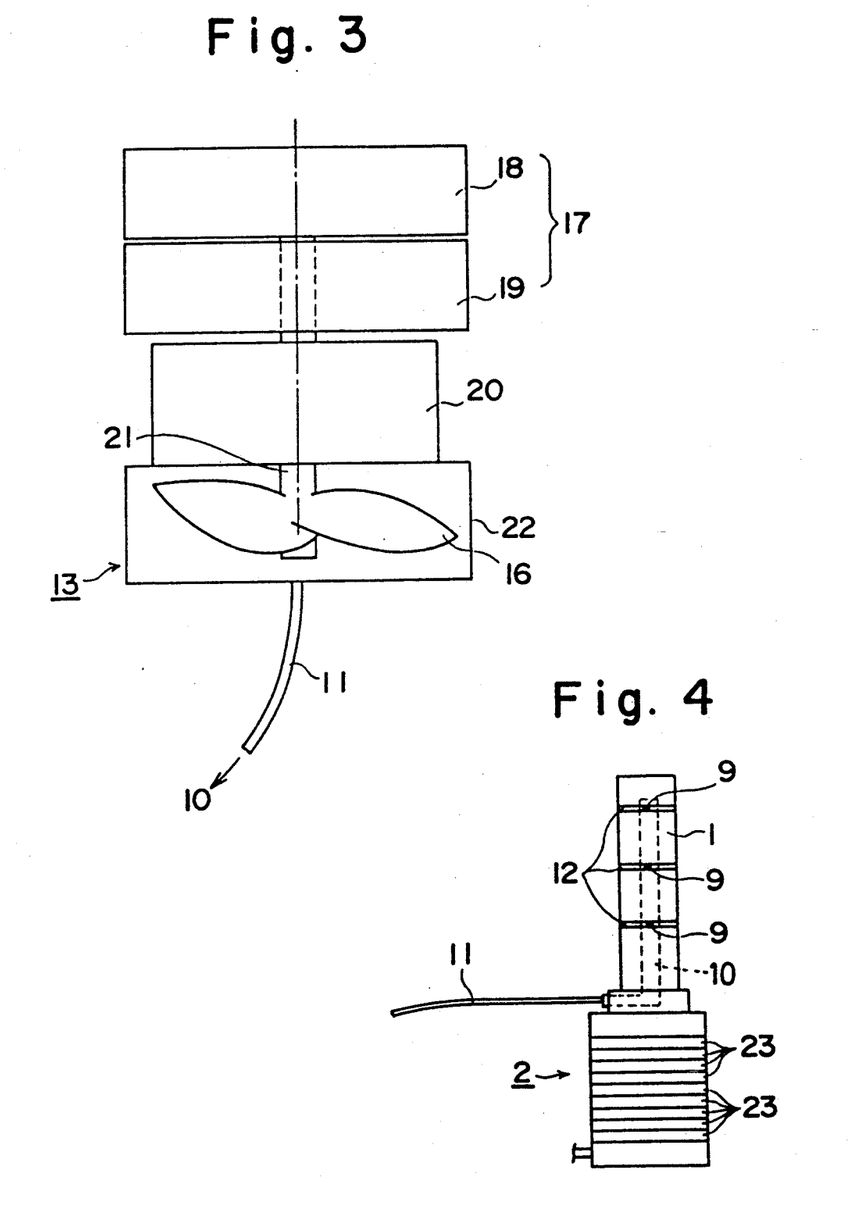
FIG. 3 is a front elevational view which illustrates an example of a negative pressure generating source which can be applied to the present invention.
FIG. 4 is a front elevational view which illustrates another example of an actuator which can be applied to the present invention and FIG. 5 is a plan view which illustrates an example of the tape drive system in the case where the present invention is applied to a VHS video tape recorder.

It is preferable that a miniature vacuum pump or a fan 16 as shown in FIG. 3 be employed as the negative pressure source 13. The fan 16 may have its own drive source, or alternative be driven by a rotary system of a magnetic recording/reproducing apparatus to which the present invention is applied. The latter, as shown, may comprise a drive motor 20 adapted for causing rotation of an upper drum 18, a part of a rotary head drum 17 associated with a video tape recorder (VTR). In this case, the fan 16 is fastened to a drive shaft 21 of the drive motor 20, so that rotation of the shaft 21 causes the fan 16 to rotate and induces a negative pressure within the casing 22. Designation 19 in FIG. 3 denotes a lower drum of the rotational drum 17.

As an alternative to the above-discussed negative pressure, a static electricity or other suitable means may be utilized for drawing or attracting the tape 7 to the tape guide post 1.

The actuator 2 for moving the tape guide post 1 in the direction of the width of the tape 7 is not limited to the above-described voice coil. For example, as shown in FIG. 4, a piezoelectric actuator formed by layering a plurality of piezoelectric elements 23 may be employed. The piezoelectric actuator 23 is provided with a mechanical strain; in other word, it is deformable physically by supplying a power thereto, such that its deformation degree corresponds to the amount of power supplied. Although omitted from illustration, the actuator 2 may be differential pressure type air cylinder, a double acting cylinder or a hydraulic cylinder.

The sensors 8 for detecting the width-wise position of the tape 7 may comprise a line sensor, a CCD, an optical sensor consisting of light emitting elements and light receiving elements, a magnetic sensor or an ultrasonic sensor.

Figure 5:
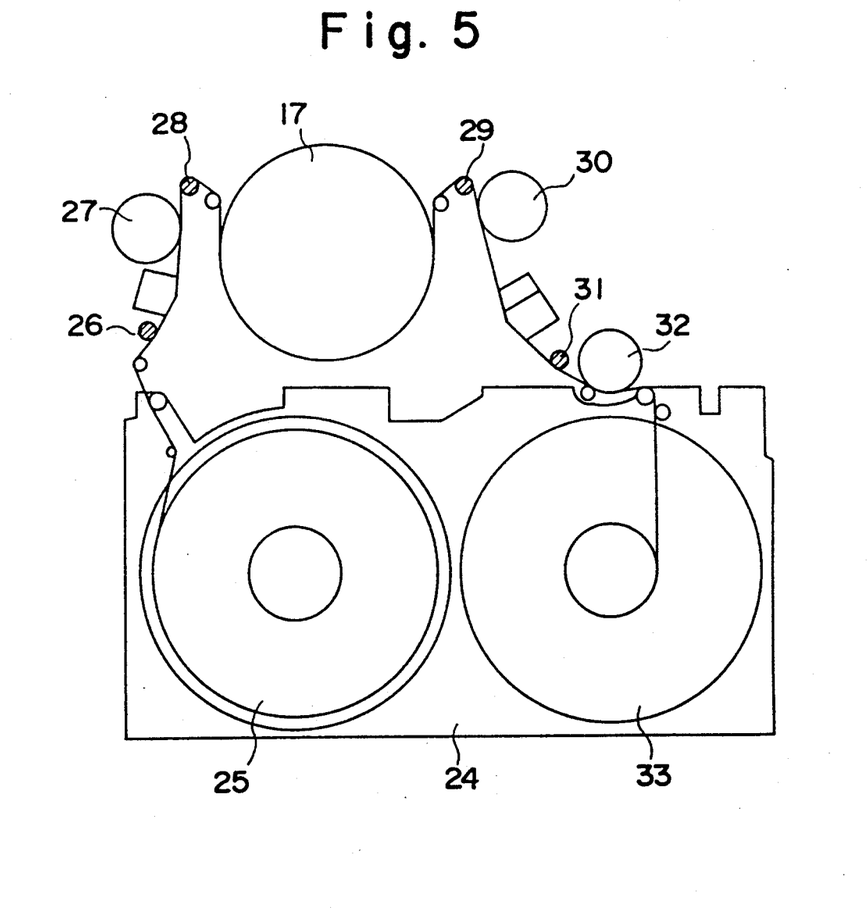

FIG. 5 illustrates an embodiment in which the tape guide post shown in FIG. 1 is applied to the tape drive system for a VHS video tape recorder. According thereto, the tape 7 is drawn out from a supply reel 25 of a cassette 24, then introduced along by a limiter post 26, an impedance roller 27 and a vertical post 28, which are all at the side of inlet of the drive system, and brought into contact with the circumferential surface of the rotary drum 17 in a properly inclined state relative thereto within a given limit of inclination angle. The tape 7 is then run along through another vertical post 29, impedance roller 30 and pinch roller 32, all of them being at the outlet side of the drive system, and wound around a winding reel 33 of the same cassette 24. The tape guide post 1, which is to be vertically moved by the actuator 2, is not limited to one in number, but may be provided in plural form in a desired combination thereof. In the above-described VHS structure, the inlet-side and outlet-side vertical posts 28, 29 of the drum 17, and if necessary, the limiter posts 26 and 31 as well, may be substituted by the foregoing vertically movable tape guide posts 1 to thereby permit correcting the width-wise deviation of the tape at plural points corresponding to the respective tape guide posts 1, hence realizing more stable run of the tape.

FIGS. 6 to 10 illustrate another embodiment of the present invention. According to this embodiment, the tape 7 is to be adjusted for run within a given location in its width-wise direction under controlled operation of inclining the tape guide post 41 by a degree corresponding to how much the tape 7 is run out from that give location. Having regard to an embodiment in FIG. 6, a bimorph piezoelectric device 43 is employed as an actuator 42 for changing the inclination of the tape guide post 41. The bimorph piezoelectric device 43 is a known device wherein two piezoelectric ceramics members 45, 45 are provided, sandwiching a copper plate 44 therebetween, and those two piezoelectric ceramics 45 are electrically connected to one electrode, while the copper plate 44 is likewise connected to another electrode, so that energizing selectively one of the two different electrodes will cause a physical strain in the selected one of the two ceramics elements 45 so as to warp the device 43 towards the corresponding side. The tape guide post 41 is merely formed in a simple rod shape, which has neither flange for restricting the tape edges nor a suction hole for attracting the tape 7, and the tape 7 is in a sliding contact with the circumferential surface of the tape guide post 41.

Figure 6:
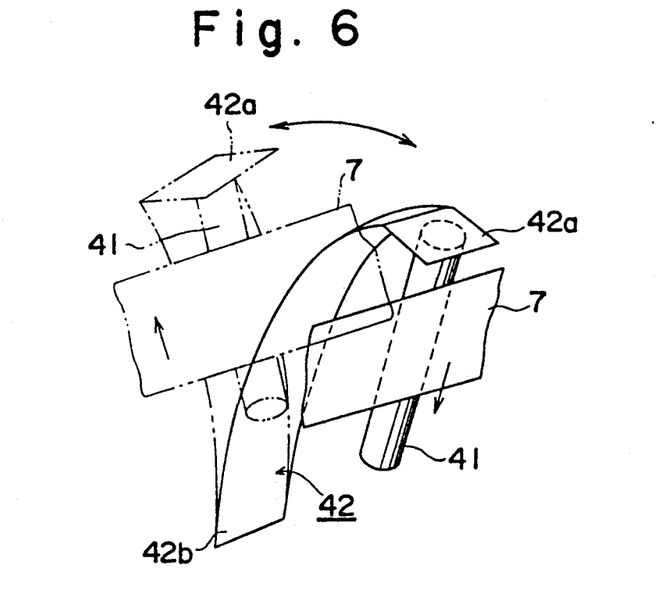
FIG. 6 is a perspective view which illustrates a principal for correcting the position of the tape according to this embodiment.

As shown in FIG. 6, the tape guide post 41 is fixedly supported, at its one, by a horizontally bent end portion 43*a* of the bimorph piezoelectric device 43. On the other hand, the bimorph piezoelectric device 43 is at its another end secured to the base member of a VTR or the like in a generally vertical relation therewith. Therefore, the tape guide post 41 is supported, depending from the upper portion of the bimorph piezoelectric device 43. Accordingly, the device 43, when applied a DC voltage, is warped in a desired direction due to a reverse piezoelectric effect therein, whereupon the tape guide post 1 can be inclined in a desired direction at a desired angle. It is noted here that the direction in which the tape guide post 1 is inclined depends upon a direction of the DC voltage applied, and the amount of such inclination varies in proportion to the level of the applied voltage. The tape guide post 41 may be directed upwardly upon the end portion 43*a* of the bimorph piezoelectric device 43, which is not shown though.

Although not illustrated in FIGS. 6 to 10, another sensor (same with the one 8 in FIG. 1) is provided along the tape path, similarly to the embodiment in FIG. 1, which of course senses the edges of the tape 7 and detects how much the tape is deviated width-wise from a given reference running position. Such sensor is not limited to a particular one, likewise in the embodiment of FIG. 1, and may be an optical sensor, for instance. A detection signal from the sensor is subjected to a predetermined signal processing and thereafter fed back to the bimorph piezoelectric device 43, whereby the device 43 is warped, which causes inclination of the tape guide post 41 in a given direction at a given angle. For example, as viewed from FIG. 6 and indicated by the solid line therein, with the bimorph piezoelectric device 43 being warped forwardly in reference to the tape 7, the tape guide post 41 is inclined such that its upper part protrudes forwardly, while its lower part stands away rearwardly opposite thereto. This inclined state cooperates with the tension of the tape 7 in contact with such tape guide post 41 to cause downward displacement of the tape 7 thereupon. On the contrary, as indicated by the phantom line in the FIG. 6, if the device 43 is warped in the rearward direction opposite to the first forward one, then the tape guide post 41 is inclined in a reverse manner as against the above-described first inclination, which acts with the tension of the tape 7 to cause the tape 7 to displace upwardly on the tape guide post 41. Thus, it is appreciated that a detection signal emitted from the tape deviation sensor stated above will be fed back in a computerized way to the bimorph piezoelectric device 43, so as to keep controlling the warping motion of the device 43 to determine a proper direction and angle in which the tape guide post 41 should be inclined, whereby the tape 7 may be adjusted in position upon the guide post 41 in its width-wise direction for a normal run thereon within the reference running position, and therefore the tape 7 is run in an assured stable manner.

Figure 8A:
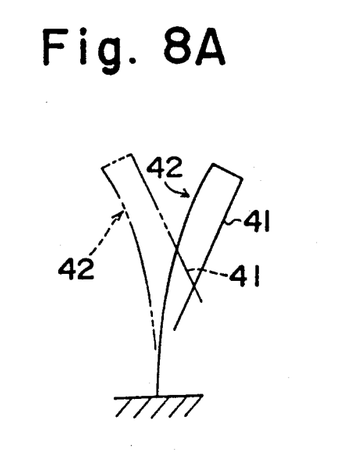
FIG. 8A and 8B are side elevational views which illustrate the operations of the tape guide posts shown in FIGS. 6 and 7 in a comparative manner.
Figure 8B:
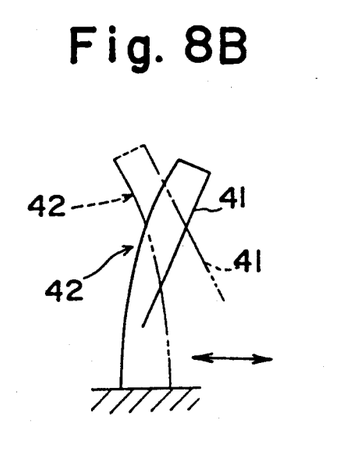

As described above, according to the embodiment shown in FIG. 6, the tape 7 can be stably driven at a predetermined position, to fulfill the object of the present invention. However, such embodiment has the defect that the tape guide post 41, as shown in FIG. 8A, will be dislocated relative to its given central point in the vertical and/or fore-and-aft direction each time of changing its inclination direction and angle, which results in varying the tension acting on the tape 7. Therefore, a consideration should be made to prevent the deviation of the tape guide post 41 while changing the inclination direction and the angle of the tape guide post 41.

Figure 7:
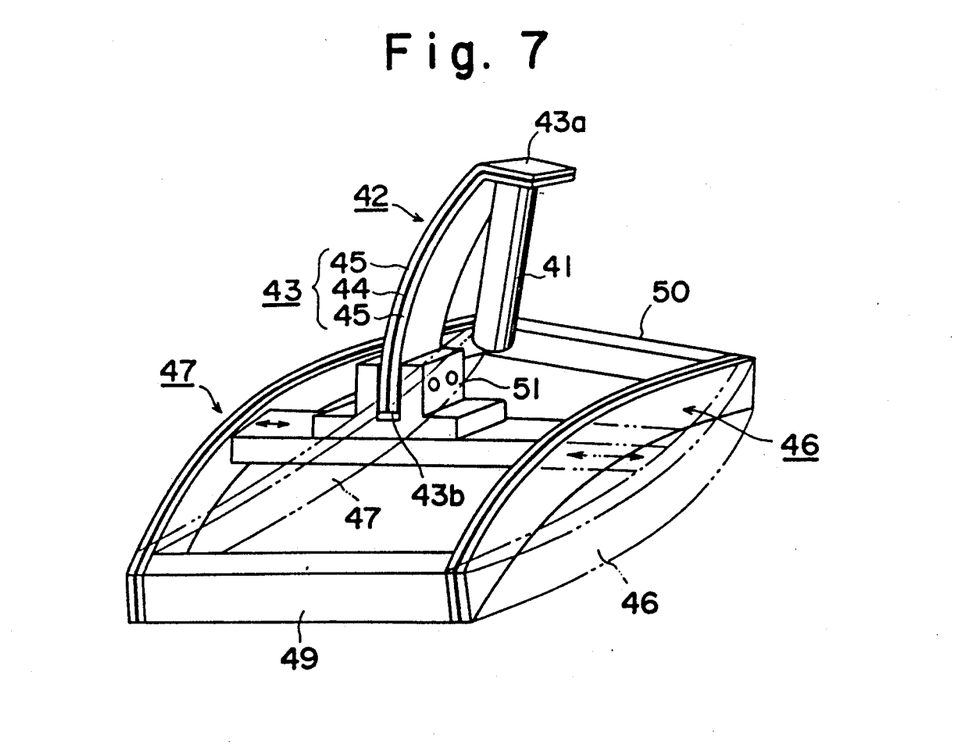
FIG. 7 is perspective view which illustrates a principle of another embodiment of the present invention.

FIG. 7 is intended to show another embodiment for that purpose, which suggests for moving the tape guide post 41 by use of bimorph piezoelectric devices 46, 47 such that the center of the post 41, at which it is inclined, is thereby caused to move.

In the FIG. 7, the bimorph piezoelectric devices 46 and 47 are disposed in parallel with each other, and connected together at their respective central portions and both side ends by means of flat plates 48, 49 and 50. Only the flat plates 49 and 50 are secured to the base member of the VTR or the like. The bimorph piezoelectric device 43, constituting the actuator 42 for supporting the tape guide post 41, is vertically disposed on the central flat plate 48. A lower end portion 43*b* of the piezoelectric device 43 is secured to a bracket 51. Similarly to the embodiment shown in FIG. 6, the bimorph piezoelectric device 43 has an upper end part 43*a* so bent to extend horizontally therefrom, to which upper end part 43*a*, is secured one end of the tape guide post 41 in a manner dependent therefrom. Like the foregoing first bimorph piezoelectric devices 45, the illustrated second bimorph piezoelectric devices 46, 47 are each comprised of two piezoelectric ceramics members and a copper plate sandwiched therebetween. By being so constructed, an output signal from the sensor, which detects the position of the tape 7 in its width-wise direction, is fed back to both first bimorph piezoelectric device 43 and second ones 46, 47. Consequently, reference being made to FIGS. 7 and 8B, the device 34 is shown by the solid line to be warped forwardly, in which case, a certain polarity and voltage are also being applied equally to both second bimorph piezoelectric devices 46, 47, thereby warping them so as to move the lower end part 43*b* of the device 43 in a rearward direction opposite to the forwardly warping of the device 34. By contrast, in the FIGS. 7 and 8B, as understandable by the phantom line, the device 43 is warped rearwardly, in which case, a certain polarity and voltage are being applied equally to both second piezoelectric devices 46, 47, there warping them so as to move that lower end part 43*b* in a forward direction opposite to the rearwardly warping of the device 34. With this arrangement, the tape guide post 41 is changed its inclination direction with respect to a point adjacent a center defined midway in the vertical length-wise direction of the same post 41, whereupon, almost no variation occurs in the position of the post 41 in vertical and fore-and-aft directions, thus preventing a change in the tension of the tape.

Figure 9:
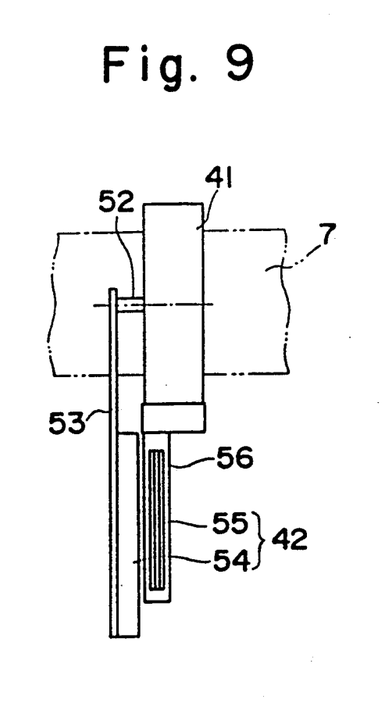
FIG. 9 is a rear view which illustrates another embodiment of the actuator of the tape guide post and FIG. 10 is a side elevational view of the actuator.
Figure 10:
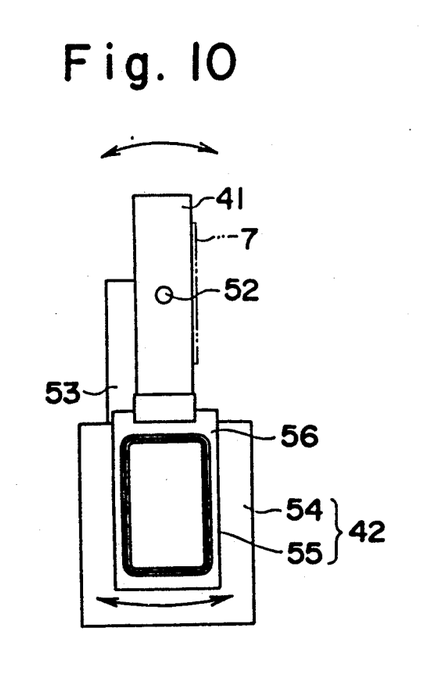

The actuator 42 for inclining the tape guide post 41 in a desired direction at a desired angle may comprise another structure such as a voice coil motor. FIGS. 9 and 10 illustrate an embodiment arranged in the above-described manner. The tape guide post 41 is, at the axial center portion thereof, rotatably supported by a secured plate 53 secured to the base member of the VTR or the like, the tape guide post 41 being supported by a horizontal shaft 52 disposed in parallel with the tape 7 at the central portion. A magnet 54 is fastened to the lower portion of the secured plate 53. Furthermore, a voice coil 55 is fastened to the lower portion of the tape guide post 41. In other words, the voice coil 55 is accommodated in a coil supporting member 56 and secured to the lower portion of the tape guide post 41 in such a manner that it is disposed in parallel with the magnet 54. The voice coil 55 and the magnet 54 constitute the voice coil motor serving as the actuator 42. According to thus-constituted voice coil motor, if an associated sensor emits a detection electric signal, which in turn energizes the voice coil 55, then a magnetic flux is produced from the coil 55 to act on the magnet 54, thereby generating a repulsive force therebetween. By virtue of the repulsive force, the tape guide post 41 is caused to incline at a desired angle relative to the shaft 52 forming a center of its inclination.

A structure may be employed in which a plurality of the above-described tape guide posts 41 capable of controlling the inclination angle are combined. In this case, the optical sensor or the like which detects the positional change of the tape 7, may not necessarily be provided by a number equal to that of the tape guide posts 41, and they may be so arranged as to be operable sequentially.

Figure 11:
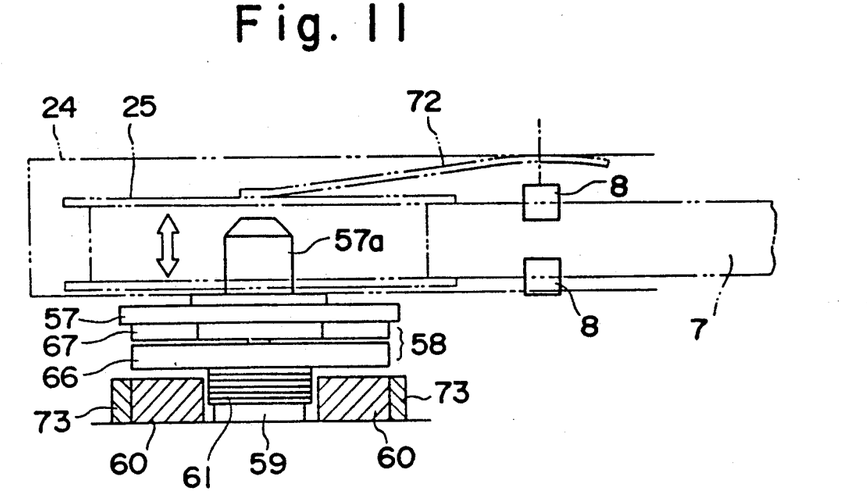
FIG. 11 is a front elevational view which illustrates a state in which the present invention is applied to a supply reel base.

FIGS. 11 to 15 illustrate another embodiment of the present invention, which suggests displacing the reel in the width-wise direction of the tape 7 in order to limit the position of the tape 7 in the direction of the width of the tape 7. FIG. 11 shows an embodiment in which a voice coil motor is employed as an actuator for moving a reel base vertically. According to this embodiment, a reel base 57 for supporting a reel, namely, the supply reel 25 and a reel base operating motor 58 for rotating the reel base 57 are supported via a coil guide portion 59, on a base member or the like of a VTR or the like in such a manner that they can be moved in the direction of the width of the tape 7. A voice coil 61, which formes the voice coil motor 62 together with a magnet 60 secured to the base member or the like, is fastebed to the lower surface of the reel base operating motor 58. In this connection, if the sensors 8 detects the dislocation of the edges of the tape 7, electric signals are imparted therefrom to the voice coil 61, thereby generating a repulsive force between the coil 61 and magnet 60, which force causes the movement of the reel base 57 and reel base in the width-wise direction of the tape 7.

Figure 12:
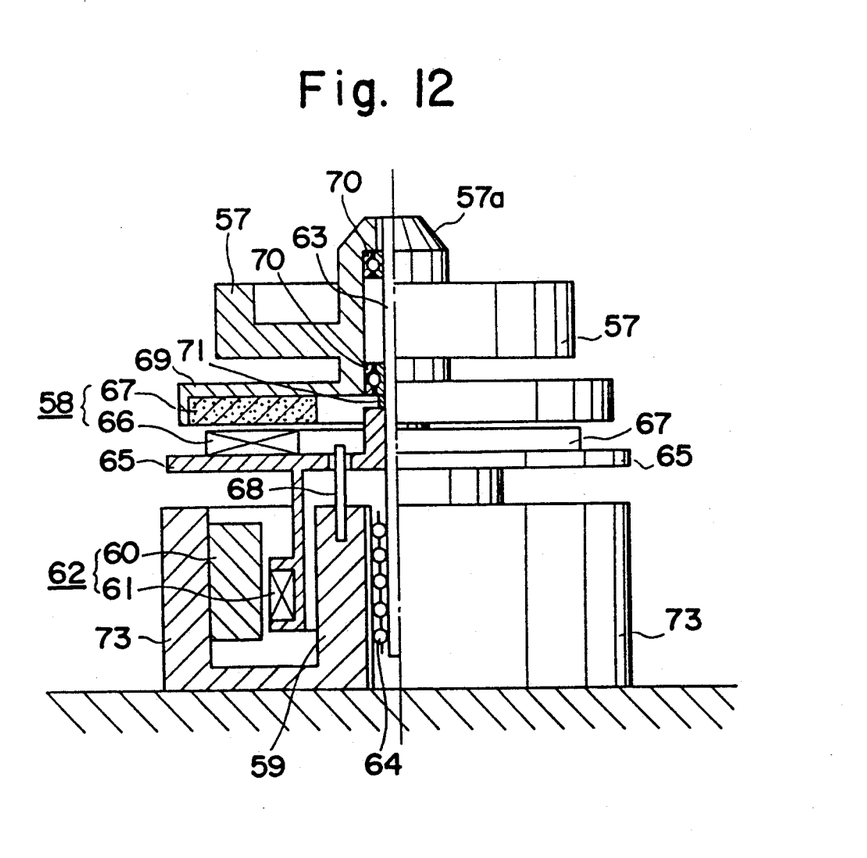
FIG. 12 is a broken-away central longitudinally sectional view which illustrates an example of specific structure of a reel base device.

More specifically, as shown in FIG. 12, the reel base device according to this embodiment comprises the reel base 57 having a reel base boss 57a, a reel shaft 63 rotatably supporting the reel base 57, a stator board 65 supported on the reel shaft 63, the coil guide portion 59 for supporting the reel shaft 63 via a linear slider 64 in such a manner that the reel shaft 63 can be moved in the axial direction, a reel base motor coil 66 and the voice coil motor 62 secured to the stator board 65, the voice coil magnet 60 which constitutes the voice coil motor 62 in association with the voice coil 61 of the stator board 65, a yoke 73 for supporting and securing the voice coil motor 62 to the base or the like and the reel base motor magnet 67 secured to the lower portion of the reel base 57 and constituting the reel base operating motor 58 in association with the coil 66 of the stator board 65. The stator board 65 and the coil guide portion 59 are arranged such as to permit them to be movable in the axial direction and prevent their rotation by means of a rotation stopping pin 68.

With the above-mentioned structure, supplying an electricity to the reel motor coil 66 causes the rotation of the reel base 57, and in the event of the sensors 8 detecting a width-wise dislocation of the tape edges, output signals are imparted therefrom so as to energize the voice coil 61, thereby generating a repulsive force between the coil 61 and voice magnet 60, which then causes a vertical movement of the reel base 57 as well as the stator board 65. Thus, it is seen that the reel base 57 is rotated and moved in a vertical direction (i.e. in the width-wise direction of the tape 7). In the drawings, reference numeral 69 represents a flange for fastening the magnet 67 to the reel base 57, 70 represents a ball bearing and 71 represents a collar.

Generally, an ordinary video tape cassette accommodates a reel therein, allowing a slight movement of the reel in the width-wise direction of the tape 7. For example, as shown in FIG. 11, the VTR cassette 24 is of such structure that a leaf spring 72 is provided at the upper side of the cassette 24, and has an end portion adapted for resiliently keeping the displacement of the supply reel 25 and a winding reel (not shown) towards the reel base when the cassette 24 is loaded in a recorder. The cassette 24, therefore, permits a slight movements of the supply reel 25 and reel base 25 to be executed by the voice coil motor 62 in the width-wise direction of the tape, insofar as the movements occur within the vertical stroke limit of the leaf spring 72, wherein, of course, the upward movement of them overcomes the force of the leaf spring 72.

As the sensors 8, 8 for detecting the dislocation of the tape edges, an optical sensor or other sensors may be employed, like the embodiment in FIG. 1. The sensors are usually disposed along the tape path between the reel base 57 and the tape guide post, for instance.

From the construction above, it is to be understood that, when rewinding the tape 7 around the supply reel 25, the optical sensors 8, 8 detect whether or not the upper and lower edges of the tape 7 are maintained within a predetermined reference height, and if the tape 7 is dislocated out of the reference position, the amount of the tape dislocation or deviation is imparted through the sensors 8, 8 and fed back to the coil 61 of the voice coil motor 62, thereby generating a proper repulsive force between the voice magnet 60 and voice coil so as to cause a desired vertical movement of the reel base 57, the repulsive force being varied in proportion to an amount of power supplied, whereby the tape 7 is so controlled to keep running at a height level within a predetermined normal height limit. This prevents an undesired non-uniform winding of the tape 7 around the reel 25. Hence, in driving the tape for a reproducing or recording purpose, the sensors 8, 8 may detect a non-uniform winding state of the tape 7 which has not yet been corrected during the rewinding, or the width-wise deviation of the tape 7 which occurs due to an uneven rotation of the reel, and then a detected amount of those phenomena is fed back to the voice coil motor 62 which causes a proper vertical movement of the reel base 57 and supply reel 25, to thereby correct the height of the tape, thus attaining a long reliable tape drive system.

Figure 13:
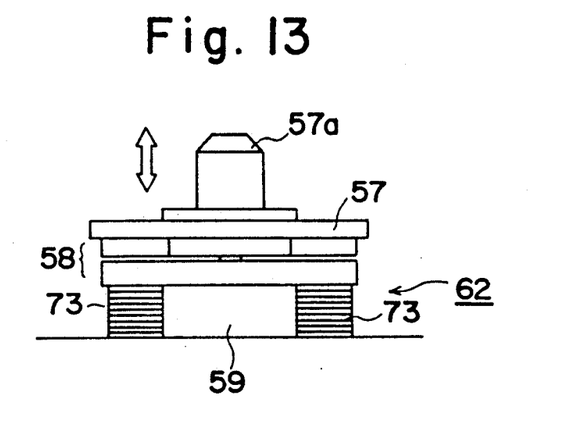
FIGS. 13 and 14 are front elevational views which respectively illustrate another embodiment of the actuator for moving the reel base.
Figure 14:
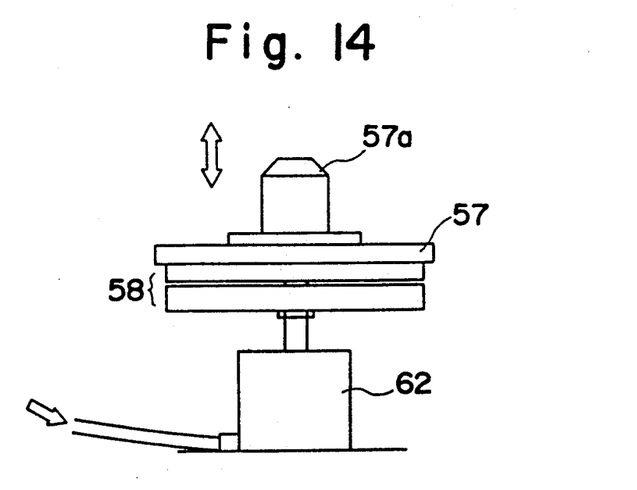

According to the above-described embodiments, the voice coil motor is employed as the actuator for vertically moving the reel base 57. However, the actuator 62 is not limited to the above-described structure. Any actuator may be employed if it displays excellent responsibility to the feedback control such as a piezoelectric actuator served by the piezoelectric device 73 as shown in FIG. 13 or an air cylinder as shown in FIG. 14. While the reel base operating motor 58 is mounted on the reel base 57 in accordance with the above-described embodiments, the reel base 57 may be, via an idler or the like, connected to another separate reel operating motor.

If a further precise tape running operation is desired, the actuator 62 may be provided on the winding reel in addition to the supply reel.

INDUSTRIAL APPLICABILITY

The tape drive mechanism according to the present invention can be suitably employed in a video tape recorder, a digital audio tape recorder or the like which uses a tape for broadcasting or a tape having a relatively reduced thickness and in which the running of the tape must be stably controlled.

The tape drive mechanism according to the present invention can be used as the tape drive mechanism for a usual analog audio tape recorder as well as the tape drive mechanism for the above-described helical scan type tape recorder.

What is claimed is:

1. A tape drive mechanism comprising:
    a sensor for detecting an amount of dislocation of said tape from a reference running position in a width-wise direction of said tape, and supplying a detection signal;
    a supply reel base device including a supply reel base for supplying said tape;
    a winding reel base device including a winding reel base for winding said tape being supplied from said supply reel base;
    an actuator provided in either or both of said supply reel base device and said winding reel base device, said actuator acting in response to said detection signal being supplied from said sensor so as to move either or both of said supply and winding reel bases in the width-wise direction of said tape in accordance with said tape dislocation amount; and
    a means for causing either or both of said supply and winding reel bases to be rotated, said means being provided in either or both of said supply and winding reel bases,
    wherein operation of said actuator and said means causes either or both of said supply and winding reel bases to be rotated, while being moved in said width-wise direction of said tape in case of said sensor detecting said tape dislocation amount, to thereby maintain said tape at a predetermined position.

2. The tape drive mechanism according to claim 1, wherein said means comprises a motor means which is included in at least one reel base and wherein said actuator is designed to move said at least one reel base vertically and is included in said at least one reel base.

3. The tape drive mechanism according to claim 1 wherein said actuator comprises a voice coil motor.

4. The tape drive mechanism according to claim 1, wherein said means comprises a motor including a rotor and a stator, wherein said rotor is to be rotated to cause simultaneous rotation of said reel base in an integral manner, wherein said stator is free to be moved in an axial direction, and caused to move in said axial direction by means of said actuator, wherein a rotation preventive means is provided, which prevents said stator from being rotated while allowing said stator to be moved in said axial direction, so that both said motor and said reel base may be moved together in said width-wise direction of said tape; wherein said stator of said motor is connected to a movable part of said actuator, and wherein said movable part of said actuator is moved in response to said detection signal supplied from said sensor, whereby said reel base, while being rotated by said motor, may be moved to maintain said tape at a predetermined position through the movement of said actuator movable part.

5. The tape drive mechanism according to claim 1, wherein said actuator is designed to move either or both of said supply and winding reel bases in a vertical direction.

* * * * *